United States Patent
Chen et al.

(10) Patent No.: US 12,497,064 B2
(45) Date of Patent: Dec. 16, 2025

(54) VEHICULAR WARNING APPARATUS AND VEHICULAR AUXILIARY-LINE ADJUSTING APPARATUS

(71) Applicant: REC Technology Corporation, Taoyuan (TW)

(72) Inventors: Chao-Chuan Chen, Taoyuan (TW); Chih-Wei Yang, Taoyuan (TW)

(73) Assignee: REC Technology Corporation, Taoyuan (TW)

( * ) Notice: Subject to any disclaimer, the term of this patent is extended or adjusted under 35 U.S.C. 154(b) by 48 days.

(21) Appl. No.: 18/652,897

(22) Filed: May 2, 2024

(65) Prior Publication Data

US 2025/0206328 A1   Jun. 26, 2025

(30) Foreign Application Priority Data

Dec. 22, 2023 (TW) .................................. 112150454

(51) Int. Cl.
*B60W 50/14* (2020.01)
*B60K 35/28* (2024.01)
(Continued)

(52) U.S. Cl.
CPC ............ *B60W 50/14* (2013.01); *B60K 35/28* (2024.01); *G06V 10/82* (2022.01); *G06V 20/56* (2022.01);
(Continued)

(58) Field of Classification Search
CPC .......... B60W 50/14; B60W 2050/143; B60W 2050/146; B60W 2420/403; G06V 10/82;
(Continued)

(56) References Cited

U.S. PATENT DOCUMENTS

| | | | |
|---|---|---|---|
| 9,487,139 B1* | 11/2016 | Ishida | .................... B60W 30/08 |
| 11,741,727 B2* | 8/2023 | Hara | ..................... G06V 20/597 |
| | | | 348/77 |

(Continued)

FOREIGN PATENT DOCUMENTS

| | | | | |
|---|---|---|---|---|
| EP | 2869284 A1 * | 5/2015 | ............. | G08G 1/167 |
| JP | 2018049496 A | 3/2018 | | |

(Continued)

OTHER PUBLICATIONS

Japan Patent Office, "Office Action", May 27, 2025, Japan.
Taiwan Patent Office, "Office Action", Nov. 4, 2024, Taiwan.

*Primary Examiner* — Chico A Foxx
(74) *Attorney, Agent, or Firm* — Troutman Pepper Locke LLP; Tim Tingkang Xia, Esq.

(57) ABSTRACT

A vehicular warning apparatus and a vehicular auxiliary-line adjusting apparatus are provided. The vehicular warning apparatus includes an image capturing device, a vehicular control-signal capturing device and a processor. The image capturing device captures an image outside of a vehicle. The vehicular control-signal capturing device captures a turning signal of the vehicle. The processor defines a first auxiliary line and a second auxiliary line, and determines whether a target object of the image touches a warning zone formed between the first auxiliary line and the second auxiliary line, and accordingly generates a warning signal. The processor also dynamically adjusts the first auxiliary line and/or the second auxiliary line according to the turning signal so as to adjust the warning zone.

16 Claims, 4 Drawing Sheets

(51) Int. Cl.
 *G06V 10/82* (2022.01)
 *G06V 20/56* (2022.01)
(52) U.S. Cl.
 CPC .. *B60K 2360/176* (2024.01); *B60K 2360/178* (2024.01); *B60W 2050/143* (2013.01); *B60W 2050/146* (2013.01); *B60W 2420/403* (2013.01); *G06V 2201/08* (2022.01)
(58) Field of Classification Search
 CPC .... G06V 20/56; G06V 2201/08; B60K 35/28; B60K 2360/178; B60K 2360/176
 See application file for complete search history.

(56) References Cited

U.S. PATENT DOCUMENTS

| | | | | |
|---|---|---|---|---|
| 2013/0321628 | A1* | 12/2013 | Eng | B60R 1/31 348/148 |
| 2014/0320637 | A1* | 10/2014 | Yi | G06V 20/56 348/118 |
| 2017/0101097 | A1* | 4/2017 | Buchner | B60W 30/12 |
| 2017/0174261 | A1* | 6/2017 | Micks | B62D 15/029 |
| 2019/0219681 | A1* | 7/2019 | Atsushi | G01S 13/931 |
| 2021/0221405 | A1* | 7/2021 | Zhu | B60W 40/04 |
| 2023/0150428 | A1* | 5/2023 | Chang | G06T 5/80 382/103 |
| 2023/0230395 | A1* | 7/2023 | Tananaev | G06T 9/00 348/148 |
| 2024/0062655 | A1* | 2/2024 | Elimalech | G08G 1/161 |
| 2024/0320984 | A1* | 9/2024 | Tasaka | G06V 10/22 |
| 2025/0026363 | A1* | 1/2025 | Harp | B60K 35/28 |

FOREIGN PATENT DOCUMENTS

| | | | | |
|---|---|---|---|---|
| JP | 2021501712 A | | 1/2021 | |
| JP | 2021064085 A | | 4/2021 | |
| JP | 2022048992 A | | 3/2022 | |
| TW | M490419 U | | 11/2014 | |
| WO | WO-2021155223 A1 * | | 8/2021 | G06T 7/248 |

* cited by examiner

VEHICULAR WARNING APPARATUS AND VEHICULAR AUXILIARY-LINE ADJUSTING APPARATUS

CROSS-REFERENCES TO RELATED APPLICATIONS

This application claims priority to Taiwan Patent Application No. 112150454 filed on Dec. 22, 2023, the entire contents of which are incorporated herein by reference.

BACKGROUND OF THE INVENTION

Field of the Invention

The present invention relates to a vehicular warning apparatus. More specifically, the present invention relates to a vehicular warning apparatus related to vehicular auxiliary lines.

Descriptions of the Related Art

For traditional vehicular warning apparatuses, a warning zone with a fixed scope is preset and displayed on a display, and an image behind a vehicle will be displayed on the display so as to determine whether to generate and send a warning depending on whether an object in the image appears in the warning zone or not. However, the scope of the traditional warning zone is fixed, which makes it difficult for the traditional warning zone to cover the blind area generated when the vehicle makes turns. In other words, if an obstacle appears in the blind area generated when the vehicle makes turns, then the obstacle will be hard to be detected by the traditional warning zone, and thus it is necessary to make improvement thereon.

SUMMARY OF THE INVENTION

In order to solve at least the above problems, an embodiment of the present invention provides a vehicular warning apparatus. The vehicular warning apparatus comprises: an image capturing device, being arranged on a vehicle for capturing an image outside the vehicle; a vehicular control-signal capturing device, being configured to capture a turning signal of the vehicle; a processor, being electrically connected with the image capturing device and the vehicular control-signal capturing device and being configured to: define a first auxiliary line and a second auxiliary line to form a warning zone between the first auxiliary line and the second auxiliary line, identify a target object in the image, determine whether the target object touches the warning zone according to the first auxiliary line and the second auxiliary line, and generate a warning signal when it is determined that the target object touches the warning zone, wherein the processor is further configured to dynamically adjust the first auxiliary line and/or the second auxiliary line according to the turning signal so as to adjust the warning zone.

In order to solve at least the above problems, the present invention further provides a vehicular auxiliary-line adjusting apparatus which comprises: a vehicular control-signal capturing device, being configured to capture a turning signal of a vehicle; and a processor, being electrically connected with the vehicular control-signal capturing device and being configured to: define a first auxiliary line and a second auxiliary line to form a warning zone between the first auxiliary line and the second auxiliary line; and dynamically adjust the first auxiliary line and/or the second auxiliary line according to the turning signal so as to adjust the warning zone.

As described above, the vehicular warning apparatus and the vehicular auxiliary-line adjusting apparatus according to the present invention can dynamically adjust the first auxiliary line and the second auxiliary line depending on whether the steering wheel or wheels of the vehicle rotate or not, thereby dynamically changing the coverage of the warning zone formed between the first auxiliary line and the second auxiliary line. Therefore, no matter whether the vehicle is in a stationary state or a moving state, the vehicular warning apparatus and the vehicular auxiliary-line adjusting apparatus according to the present invention can dynamically adjust the warning zone to cover all blind areas of the vehicle as long as the steering wheel or wheels of the vehicle rotate. Accordingly, the vehicular warning apparatus and the vehicular auxiliary-line adjusting apparatus according to the present invention indeed effectively overcome the above problems.

What described above are not intended to limit the present invention, but only generally describe the technical problems that can be solved by the present invention, the technical means that can be adopted by the present invention and the technical effects that can be achieved by the present invention so as to provide preliminary appreciation of the present invention by those of ordinary skill in the art. According to the attached drawings and the contents described in the following embodiments, those of ordinary skill in the art can further appreciate the details of various embodiments of the present invention.

DESCRIPTION OF THE PREFERRED EMBODIMENT

Figure 1:
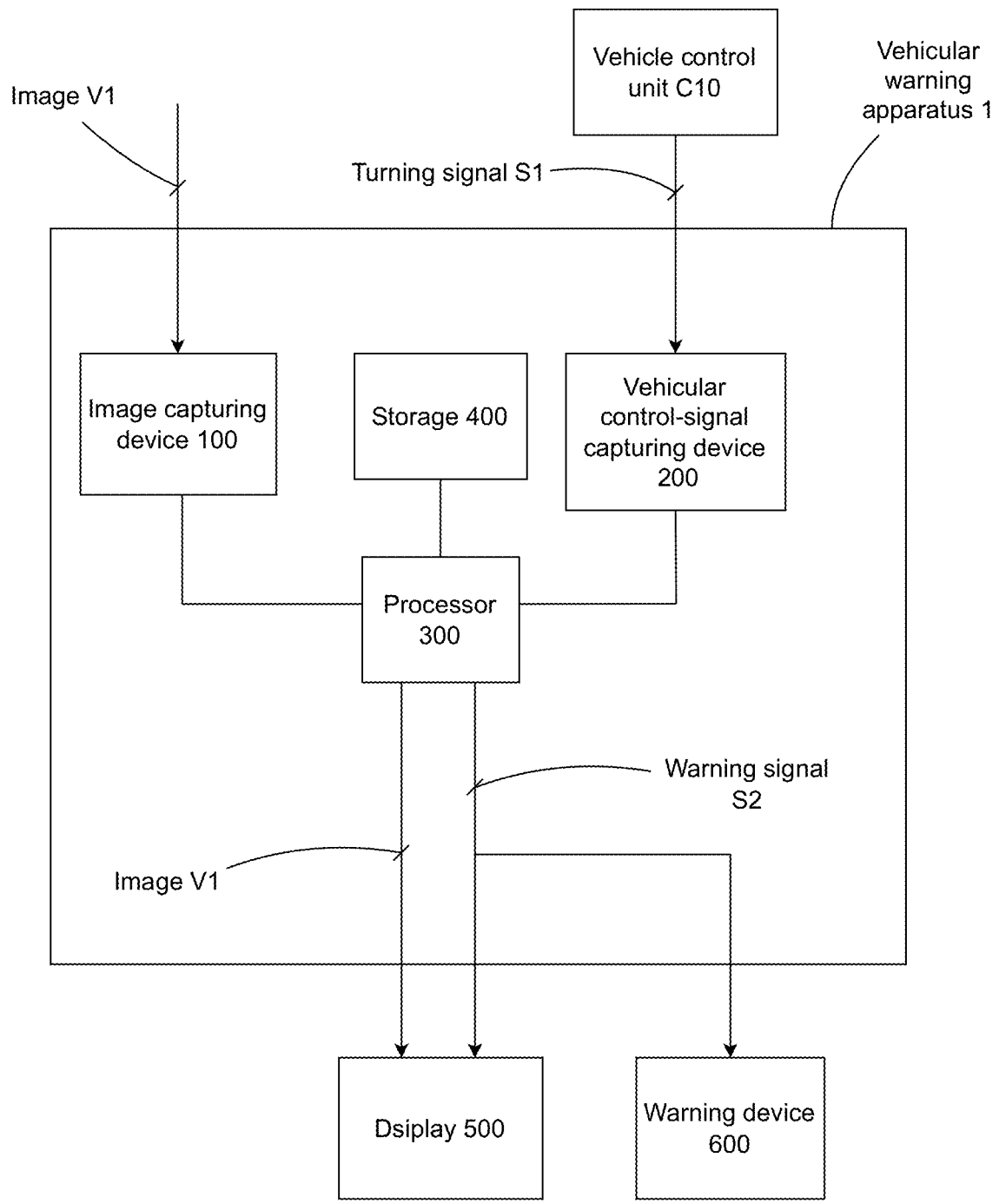
FIG. 1 is a schematic view illustrating the architecture of a vehicular warning apparatus and a vehicular auxiliary-line adjusting apparatus according to some embodiments of the present invention.

Hereinafter, the present invention will be described with reference to a number of embodiments. These embodiments, however, are not intended to limit the present invention to be implemented only according to operations, environment, applications, structures, flow processes or steps described herein. Elements unrelated to the present invention are omitted from depiction, but may be implied in the attached drawings. In the attached drawings, dimensions of and dimensional scales among individual elements are provided only for illustration, and are not intended to limit the present invention. Unless otherwise specified, in the following description, the same (or similar) reference numerals may correspond to the same (or similar) elements. Unless otherwise specified, the number of respective elements described below may be one or more while being implementable.

Terms used in this disclosure are only for describing the embodiments and are not intended to limit the present invention. Unless clearly indicated otherwise in the context, the singular form "a/an/one" is intended to include the plural form as well. Terms such as "including" and "comprising" indicate the presence of features, integers, steps, operations, elements and/or components described herein, but do not exclude the presence of one or more other features, integers, steps, operations, elements, components and/or combinations thereof. The term "and/or" includes any and all combinations of one or more related items listed.

Unless otherwise stated in the context, descriptors such as "first auxiliary line", "second auxiliary line", "first sub-zone", "second sub-zone" and "third sub-zone" are only used to distinguish the elements preceded by the descriptors, and such descriptors should not be construed as indicating the sequence.

FIG. 1 is a schematic view illustrating the architecture of a vehicular warning apparatus 1 according to the present invention. The content shown in FIG. 1 is only for illustrating some embodiments of the present invention, and is not intended to limit the scope claimed in the present invention.

As shown in FIG. 1, in some embodiments of the present invention, the vehicular warning apparatus 1 may comprise an image capturing device 100, a vehicular control-signal capturing device 200, a processor 300, a storage 400 and other elements. The processor 300 is electrically connected with the image capturing device 100, the vehicular control-signal capturing device 200 and the storage 400.

The image capturing device 100 may be arranged on a vehicle to capture an image V1 outside the vehicle. For example, the image V1 may be an image or an image in a film taken in various directions, such as an image or an image in a film taken at the front, rear and sides of the vehicle.

The vehicular control-signal capturing device 200 may be electrically connected with a vehicle control unit C10 of the vehicle, and may be configured to capture all control signals of the vehicle from the vehicle control unit C10, including a turning signal S1 related to rotation of the steering wheel of the vehicle. For example, the vehicular control-signal capturing device 200 may capture the turning signal S1 related to the rotation of the steering wheel of the vehicle from the vehicle control unit C10 through a Controller Area Network (CAN), a Local Interconnect Network (LIN), a Universal Asynchronous Receiver/Transmitter (UART), or an Inter-Integrated Circuit ($I^2C$).

The processor 300 may be a microprocessor or a microcontroller capable of signal processing or the like. The microprocessor or the microcontroller is a kind of programmable specific integrated circuit that is capable of operating, storing, outputting/inputting or the like; moreover, the microprocessor or the microcontroller can receive and process various coded instructions, thereby performing various logical operations and arithmetical operations and outputting corresponding operation results. The processor 300 may be programmed to execute various operations or programs in the vehicular warning apparatus 1.

The processor 300 may be configured to define a first auxiliary line and a second auxiliary line to form a warning zone between the first auxiliary line and the second auxiliary line. For example, the processor 300 may define the first auxiliary line and the second auxiliary line according to a size of the vehicle and an installation position of the image capturing device 100. The processor 300 may be further configured to transmit data of the first auxiliary line and the second auxiliary line to a display 500 so as to display the first auxiliary line and the second auxiliary line on the display 500. The warning zone between the first auxiliary line and the second auxiliary line may be a single zone or may be further divided into a plurality of zones. For example, the processor 300 may divide the warning zone into at least two sub-zones, and different sub-zones correspond to different levels of danger respectively.

The processor 300 may be further configured to identify one or more target objects in the image V1, and determine whether the one or more target objects touch the warning zone according to the first auxiliary line and the second auxiliary line. The image V1 may contain multiple objects therein, and only the target object is the object that will be used to determine whether the warning zone is touched. In other words, it is unnecessary for the processor 300 to make judgement on all the objects in the image V1. In some embodiments, the processor 300 may identify one or more target objects from the image V1 through a neural network model, and then make judgment only on the one or more target objects. The neural network model is an object recognition model generated by machine learning and training in advance, and in the process of machine training, neural network algorithms such as sub-pixel multiple-filtering convolution, linear equalization rectification and adaptive pooling may be used. In some embodiments, the processor 300 may also identify one or more target objects from the image V1 by comparing the objects in the image V1 with a target object database, and then make judgement only on the one or more target objects. For example, the processor 300 may identify a person or a car in the image V1 as a target object, and identify other objects in the image V1 (e.g., weeds, paper flying at high speed or birds) as general objects, and then only determine whether the person or the car in the image V1 touches the warning zone formed between the first auxiliary line and the second auxiliary line.

When the processor 300 determines that a certain target object touches the warning zone, the processor 300 will generate a warning signal. In some embodiments, the processor 300 is further configured to transmit the warning signal to the display 500, another display (not shown), and/or a warning device 600. For example, the warning device 600 may be a light warning device or an acoustic warning device, and the light warning device may be for example a warning lamp on a vehicle, while the acoustic warning device may be for example a speaker on a vehicle (which gives warning by sounds or voices). The other display may be one of various portable devices or various cloud devices.

In some embodiments, before one or more target objects are identified from the image V1, the processor 300 may also perform image preprocessing on the image V1. For example, the processor 300 may perform image preprocessing such as cutting, scaling up or scaling down the image V1 or adjusting the contrast and resolution of the image V1 in advance or the like according to the current light brightness inside and outside the vehicle, the specifications of the display 500, and/or the display positions of the first auxiliary line and the second auxiliary line on the screen of the display 500 or the like.

The storage 400 may be configured to store data generated by the vehicular warning apparatus 1 or data transmitted from the outside to the vehicular warning apparatus 1. For example, the storage 400 may be configured to store the image V1, the data related to the first auxiliary line and the second auxiliary line, a target object database, and the like. The storage 400 may comprise a primary memory (which is also called a main memory or an internal memory), and the processor 300 may directly read instruction sets stored in the primary memory and execute these instruction sets if needed. The storage 400 may optionally comprise a secondary memory (which is also called an external memory or an auxiliary memory) which can transmit data stored to the primary memory through a data buffer. The secondary memory may be for example but not limited to a hard disk, an optical disk or the like. The storage 400 may optionally comprise a tertiary memory, i.e., a storage device that may be directly plugged into or removed from the computer, such as a portable hard disk. The storage 400 may also optionally comprise a cloud storage unit.

Figure 2A:
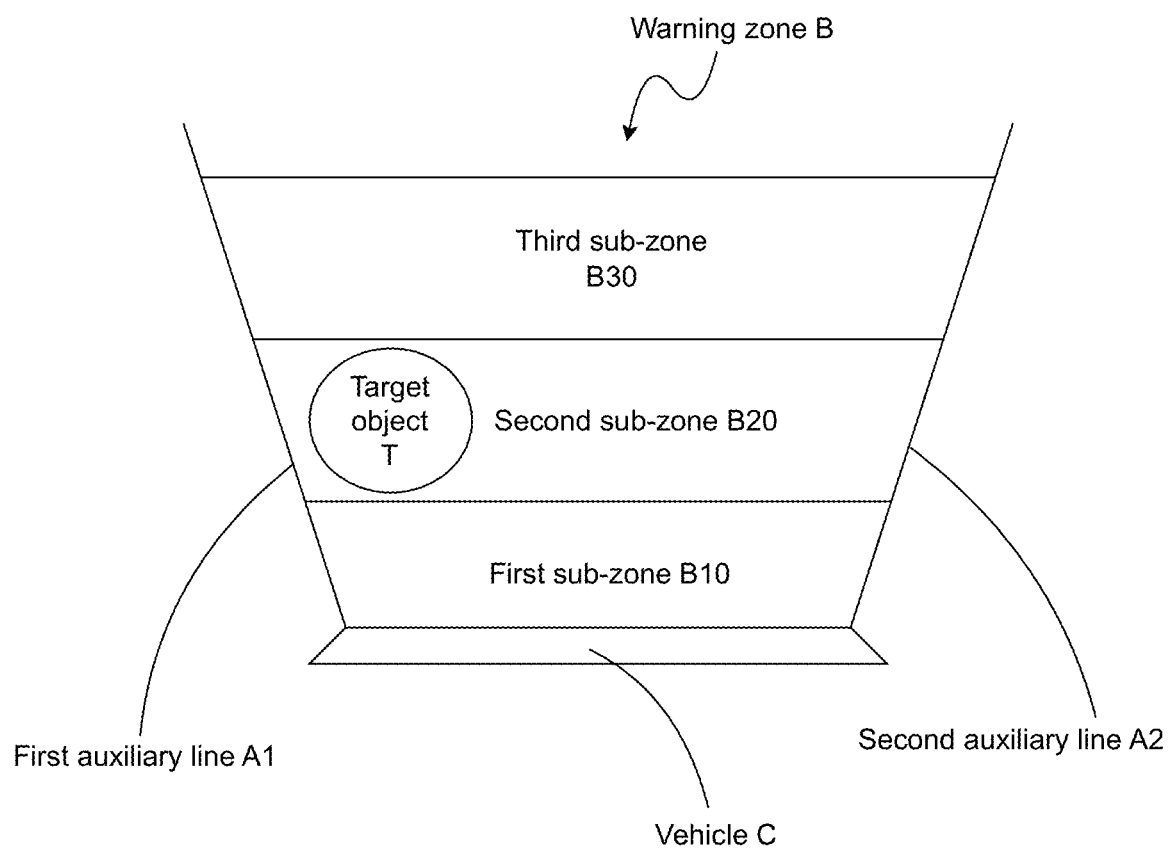
FIG. 2A to FIG. 2C are schematic views illustrating a method for dynamically adjusting vehicular auxiliary lines in different embodiments of the present invention.
Figure 2B:
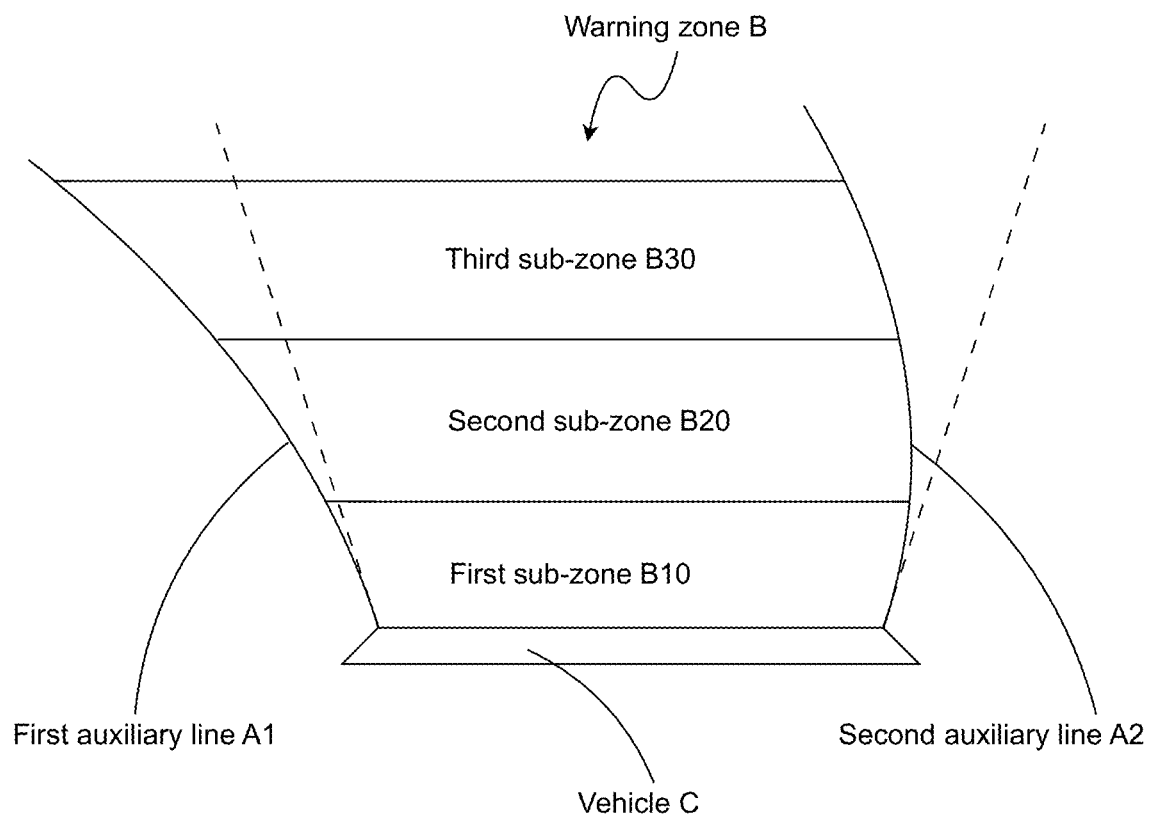
Figure 2C:
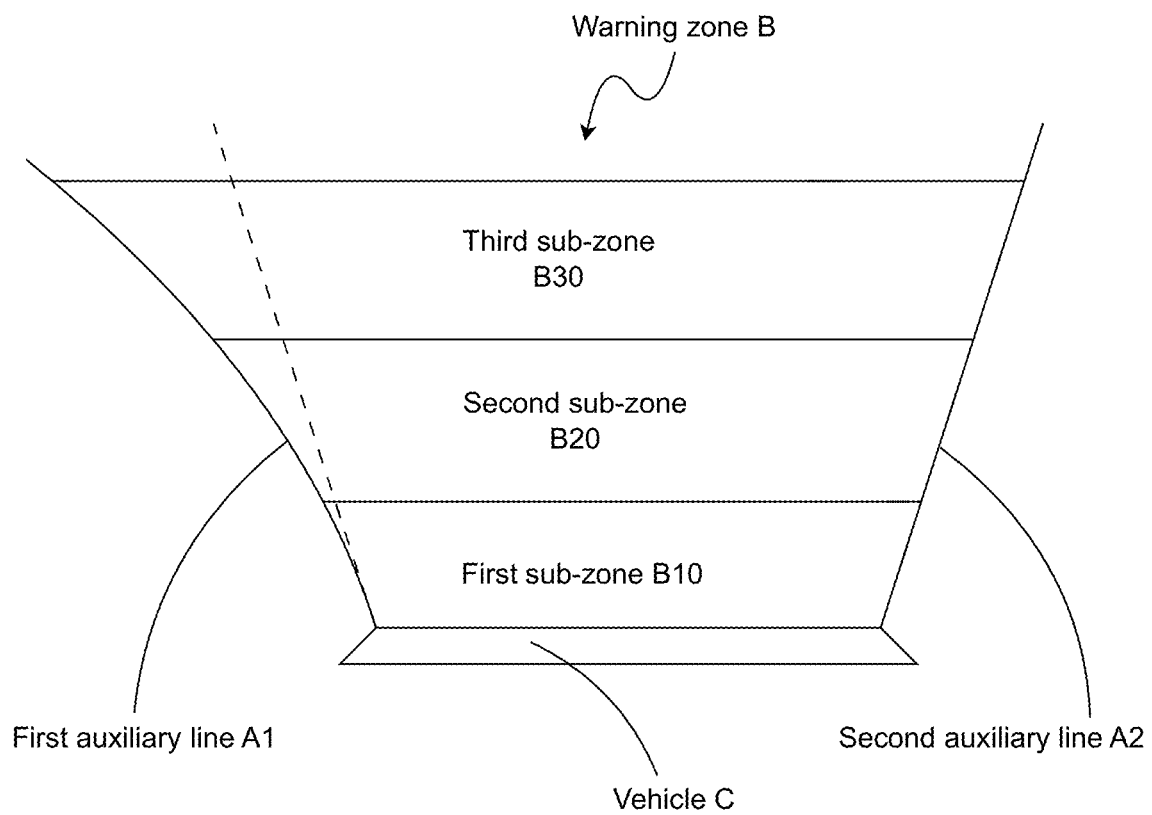

As shown in FIG. 2A, FIG. 2B and FIG. 2C, the processor 300 may also be configured to dynamically adjust the first auxiliary line and/or the second auxiliary line according to the turning signal S1 captured by the vehicular control-signal capturing device 200 so as to adjust the warning zone. FIG. 2A to FIG. 2C are schematic views illustrating a method for dynamically adjusting vehicular auxiliary lines according to different embodiments of the present invention. The contents shown in FIG. 2A to FIG. 2C are only for illustrating some embodiments of the present invention, and are not intended to limit the scope of the present invention.

Referring to FIG. 2A first, it is assumed that a first auxiliary line A1, a second auxiliary line A2 and a warning zone B are displayed on the display 500, and the warning zone B comprises a first sub-zone B10, a second sub-zone B20 and a third sub-zone B30. In addition, the first sub-zone B10 is the closest one to the vehicle C while the third sub-zone B30 is the farthest from the vehicle C, and thus the first sub-zone B10 corresponds to the highest level of danger while the third sub-zone B30 corresponds to the lowest level of danger. In some embodiments, the processor 300 may mark the coverages of the three sub-zones with different colors on the display 500 so as to represent different levels of danger. For example, the coverages of the first sub-zone B10, the second sub-zone B20 and the third sub-zone B30 are filled with red, yellow and green respectively. When the display 500 shows that a target object T in the image V1 touches the warning zone B, it means that the processor 300 will determine the level of danger corresponding to the sub-zone of the warning zone B that is touched by the target object T and then generate the corresponding warning signal.

For example, the first sub-zone B10 is the closest one to the vehicle C, and thus the vehicle C is more likely to touch the first sub-zone B10. Therefore, when the processor 300 determines that a target object T in the image V1 touches or appears in the first sub-zone B10, a warning signal S2 generated by the processor 300 will make the display 500 and/or the warning device 600 issue a warning in forms of urgent warning sounds, flashing lights and/or voices or the like. When the processor 300 determines that a target object T in the image V1 touches or appears in the second sub-zone B20, the warning signal S2 generated by the processor 300 will make the display 500 and/or the warning device 600 issue a warning in forms of steady warning sounds, flashing lights and/or voices or the like because the second sub-zone B20 is a little far from the vehicle C. When the processor 300 determines that a target object T in the image V1 touches or appears in the third sub-zone B30, the warning signal S2 generated by the processor 300 will make the display 500 and/or the warning device 600 issue a warning in forms of slow warning sounds, flashing lights and/or voices because the third sub-zone B30 is still far from the vehicle C.

Next, referring to FIG. 2B, when the vehicle C is going to turn left into a curve, or when the driver needs to turn left to back the vehicle C, the vehicular control-signal capturing device 200 may capture the turning signal S1 of the vehicle C from the vehicle control unit C10 and transmit the turning signal S1 to the processor 300. Then, the processor 300 may dynamically adjust the first auxiliary line A1 and/or the second auxiliary line A2 according to the turning signal S1, and dynamically present the adjusted results on the display 500. As shown in FIG. 2B, when the driver rotates the steering wheel to the left, the processor 300 may dynamically adjust the first auxiliary line A1 and the second auxiliary line A2 from the original straight lines into leftward curves, and present the adjusted first auxiliary line A1 and second auxiliary line A2 on the display 500 so that the measurement coverage of the auxiliary lines may cover the blind areas when the vehicle C makes turns. In some embodiments, the processor 300 may additionally present the first auxiliary line A1 and the second auxiliary line A2 before the adjustment (which are for example shown in dotted lines in FIG. 2B) on the display 500. Similarly, when the driver rotates the steering wheel to the right, the processor 300 may dynamically adjust the first auxiliary line A1 and the second auxiliary line A2 from the original straight lines into rightward curves, and present the adjusted first auxiliary line A1 and second auxiliary line A2 on the display 500.

In some embodiments, instead of adjusting the first auxiliary line A1 and the second auxiliary line A2 in FIG. 2B to be leftward curves, the processor 300 may shift the first auxiliary line A1 to the left or rotate the first auxiliary line A1 counterclockwise with the axis unchanged, and shift the second auxiliary line A2 to the right or rotate the second auxiliary line A2 clockwise with the axis unchanged, so that the warning zone B is expanded to cover the blind areas when the vehicle C makes turns. In some embodiments, while adjusting the first auxiliary line A1 and the second auxiliary line A2 in FIG. 2B to be leftward curves, the processor 300 may also concurrently shift the leftward curved first auxiliary line A1 to the left or rotate the leftward curved first auxiliary line A1 counterclockwise with the axis unchanged, and shift the leftward curved second auxiliary line A2 to the right or rotate the leftward curved second auxiliary line A2 clockwise with the axis unchanged.

Referring to FIG. 2C again, in some embodiments of the present invention, when the driver rotates the steering wheel to the left, the processor 300 may only dynamically adjust one of the first auxiliary line A1 and the second auxiliary line A2 from the original straight line into a leftward curve. For example, only the first auxiliary line A1 is adjusted to be the leftward curve while the second auxiliary line A2 is kept to be the straight line, which may ensure that the measurement coverage of the auxiliary lines can cover the blind areas at the front or rear sides of the vehicle C. Similarly, when the driver rotates the steering wheel to the right, the processor 300 may only dynamically adjust one of the first auxiliary line A1 and the second auxiliary line A2 from the original straight line into a rightward curve. For example, only the second auxiliary line A2 is adjusted to be the rightward curve while the first auxiliary line A1 is kept to be the straight line.

In some embodiments, instead of adjusting the first auxiliary line A1 in FIG. 2C to be a leftward curve, the processor 300 may shift the first auxiliary line A1 to the left or rotate the first auxiliary line A1 counterclockwise with the axis unchanged, so that the warning zone B is expanded to cover the blind area when the vehicle C makes turns. In some embodiments, while adjusting the first auxiliary line A1 in FIG. 2C to be a leftward curve, the processor 300 may also concurrently shift the leftward curved first auxiliary line A1 to the left or rotate the leftward curved first auxiliary line A1 counterclockwise with the axis unchanged.

In some embodiments, the processor 300 may comprise a first processor and a second processor, and the storage 400 may comprise a first storage and a second storage. The first processor, the first storage and the vehicular control-signal capturing device 200 may be combined into a vehicular auxiliary-line adjusting apparatus. The first processor is electrically connected with the vehicular control-signal capturing device 200 and is configured to define a first auxiliary line and a second auxiliary line to form a warning zone between the first auxiliary line and the second auxiliary line. The first processor is further configured to dynamically adjust the first auxiliary line and/or the second auxiliary line according to the turning signal S1 so as to adjust the warning zone. The first storage is configured to store data of the first auxiliary line and the second auxiliary line.

In addition, the second processor is configured to identify a target object in the image V1, and determine whether the target object in the image V1 touches the warning zone according to the first auxiliary line and the second auxiliary line defined by the first processor. When it is determined that the target object touches the warning zone, the second processor will generate a warning signal S2 and transmit the warning signal S2 to the display 500 and/or the warning device 600. The second processor is further configured to transmit the image V1 and the data of the first auxiliary line and the second auxiliary line defined by the first processor to the display 500. In addition, the second processor is further configured to perform image preprocessing on the image V1.

The above embodiments are only examples for illustrating the present invention, and are not intended to limit the scope to be claimed. Any other embodiments produced by modifying, changing, adjusting and integrating the above-mentioned embodiments shall all be included in the scope of the present invention as long as they are not difficult for those of ordinary skill in the art to contemplate. The scope to be claimed for the present invention shall be governed by the appendant claims.

What is claimed is:

1. A vehicular warning apparatus, comprising:
   an image capturing device, being arranged on a vehicle and being configured to capture an image outside the vehicle;
   a vehicular control-signal capturing device, being configured to capture a turning signal of the vehicle;
   a processor, being electrically connected with the image capturing device and the vehicular control-signal capturing device, and being configured to:
   define a first auxiliary line and a second auxiliary line to form a warning zone between the first auxiliary line and the second auxiliary line;
   identify a target object in the image;
   determine whether the target object touches the warning zone according to the first auxiliary line and the second auxiliary line; and
   generate a warning signal when it is determined that the target object touches the warning zone;
   wherein the processor is further configured to dynamically adjust the first auxiliary line and/or the second auxiliary line according to the turning signal so as to adjust the warning zone.

2. The vehicular warning apparatus according to claim 1, wherein the processor defines the first auxiliary line and the second auxiliary line according to a size of the vehicle and an installation position of the image capturing device.

3. The vehicular warning apparatus according to claim 1, further comprising a storage which is configured to store data of the first auxiliary line and the second auxiliary line.

4. The vehicular warning apparatus according to claim 1, wherein the vehicular control-signal capturing device captures the turning signal of the vehicle through a Controller Area Network (CAN), a Local Interconnect Network (LIN), a Universal Asynchronous Receiver/Transmitter (UART), or an Inter-Integrated Circuit ($I^2C$).

5. The vehicular warning apparatus according to claim 1, wherein the warning zone comprises at least two sub-zones which correspond to different levels of danger respectively.

6. The vehicular warning apparatus according to claim 1, wherein the image is a rear image of the vehicle.

7. The vehicular warning apparatus according to claim 1, wherein the processor identifies the target object from the image by a neural network model.

8. The vehicular warning apparatus according to claim 1, wherein the processor is further configured to perform image preprocessing for the image.

9. The vehicular warning apparatus according to claim 1, wherein the processor is further configured to transmit the warning signal to a display and/or a warning device.

10. The vehicular warning apparatus according to claim 9, wherein the warning device is a light warning device or an acoustic warning device.

11. The vehicular warning apparatus according to claim 1, wherein the processor further transmits the image and the data of the first auxiliary line and the second auxiliary line to a display.

12. A vehicular auxiliary-line adjusting apparatus, comprising:
    a vehicular control-signal capturing device, being configured to capture a turning signal of a vehicle; and
    a processor, being electrically connected with the vehicular control-signal capturing device and being configured to:
    define a first auxiliary line and a second auxiliary line to form a warning zone between the first auxiliary line and the second auxiliary line; and
    dynamically adjust the first auxiliary line and/or the second auxiliary line according to the turning signal so as to adjust the warning zone.

13. The vehicular auxiliary-line adjusting apparatus according to claim 12, wherein the processor defines the first auxiliary line and the second auxiliary line according to a size of the vehicle and an installation position of an image capturing device.

14. The vehicular auxiliary-line adjusting apparatus according to claim 12, further comprising a storage which is configured to store data of the first auxiliary line and the second auxiliary line.

15. The vehicular auxiliary-line adjusting apparatus according to claim 12, wherein the vehicular control-signal capturing device captures the turning signal of the vehicle through a Controller Area Network (CAN), a Local Interconnect Network (LIN), a Universal Asynchronous Receiver/Transmitter (UART), or an Inter-Integrated Circuit (PC).

16. The vehicular auxiliary-line adjusting apparatus according to claim 12, wherein the warning zone comprises at least two sub-zones which correspond to different levels of danger respectively.

* * * * *